(12) United States Patent
Hasegawa et al.

(10) Patent No.: US 10,365,541 B2
(45) Date of Patent: Jul. 30, 2019

(54) LENS BARREL

(71) Applicant: Panasonic Intellectual Property Management Co., Ltd., Osaka (JP)

(72) Inventors: Atsushi Hasegawa, Osaka (JP); Shuhei Ayukawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/784,121

(22) Filed: Oct. 14, 2017

(65) Prior Publication Data

US 2018/0113375 A1 Apr. 26, 2018

(30) Foreign Application Priority Data

Oct. 20, 2016 (JP) ................................ 2016-206414

(51) Int. Cl.
| | |
|---|---|
| *G02B 7/02* | (2006.01) |
| *G03B 17/04* | (2006.01) |
| *G02B 7/04* | (2006.01) |
| *G02B 7/10* | (2006.01) |
| *G02B 15/16* | (2006.01) |
| *G02B 27/64* | (2006.01) |

(52) U.S. Cl.
CPC .............. *G03B 17/04* (2013.01); *G02B 7/022* (2013.01); *G02B 7/023* (2013.01); *G02B 7/04* (2013.01); *G02B 7/10* (2013.01); *G02B 15/16* (2013.01); *G02B 27/646* (2013.01)

(58) Field of Classification Search
CPC ........ G03B 17/04; G02B 7/022; G02B 7/023; G02B 7/04; G02B 7/10; G02B 15/16

USPC ......................................................... 396/349
See application file for complete search history.

(56) References Cited

U.S. PATENT DOCUMENTS

| | | | | |
|---|---|---|---|---|
| 5,668,670 | A | * | 9/1997 | Nakayama ................ G02B 7/10 359/694 |
| 2002/0141081 | A1 | * | 10/2002 | Onda ...................... G02B 7/102 359/823 |
| 2005/0162752 | A1 | * | 7/2005 | Hayashi ................. G02B 7/102 359/704 |
| 2007/0002469 | A1 | * | 1/2007 | Matsugae .............. G02B 7/022 359/811 |

(Continued)

FOREIGN PATENT DOCUMENTS

| | | |
|---|---|---|
| JP | 2003-295029 A | 10/2003 |
| JP | 2007-011185 A | 1/2007 |

(Continued)

*Primary Examiner* — Clayton E. LaBalle
*Assistant Examiner* — Linda B Smith
(74) *Attorney, Agent, or Firm* — Renner, Otto, Boisselle & Sklar, LLP

(57) ABSTRACT

Provided is a collapsible lens barrel including a base barrel, a drive device including a linear motion member reciprocating in an optical axis direction and a drive source for driving the linear motion member, a cam frame provided with a cam groove, a drive device frame that is engaged with the cam groove and causes the drive device to reciprocate in the optical axis direction, a focus lens group frame that holds a focus lens group, and a contact part and an arm that extend from the focus lens group frame toward an object side and are engaged with the linear motion member to cause the focus lens group frame to reciprocate in the optical axis direction.

7 Claims, 8 Drawing Sheets

(56) References Cited

U.S. PATENT DOCUMENTS

| | | | |
|---|---|---|---|
| 2012/0328276 A1* | 12/2012 | Toyama | G02B 7/08 396/85 |
| 2016/0018622 A1* | 1/2016 | Ishimasa | G02B 13/0045 359/699 |
| 2016/0170171 A1* | 6/2016 | Nagao | G02B 7/10 359/700 |

FOREIGN PATENT DOCUMENTS

| | | |
|---|---|---|
| JP | 2007-233130 A | 9/2007 |
| JP | 2013-037282 A | 2/2013 |

* cited by examiner

LENS BARREL

BACKGROUND

1. Technical Field

The present disclosure relates to a lens barrel used for an imaging device, and relates to reduction in size of a collapsible lens barrel.

2. Description of the Related Art

A so-called collapsible lens barrel which is extended to perform zooming during shooting and is collapsed to be housed during non-shooting may be used for an imaging device, such as a digital still camera or a digital video camera, that can convert an optical image of an object into an electric image signal and output the resultant image signal.

As such a collapsible lens barrel, there is a lens barrel configured such that a drive device for driving a focus lens is disposed in a barrel and is moved along an optical axis direction by being engaged with a cam frame, as disclosed in Unexamined Japanese Patent Publication No. 2003-295029.

SUMMARY

The present disclosure provides a lens barrel which includes a drive device for driving a focus lens group in a barrel, and is configured to be compactly collapsed during non-shooting and to be capable of moving the focus lens group to an image plane side during shooting.

The collapsible lens barrel of the present invention that is used for an imaging device, the collapsible lens barrel including a base barrel mounted to the imaging device, a drive device including a linear motion member reciprocating in an optical axis direction and a drive source for driving the linear motion member, a cam frame disposed inside the base barrel and provided with a cam groove, a drive device frame that is engaged with the cam groove in the cam frame and causes the drive device to reciprocate in the optical axis direction, a focus lens group frame that holds a focus lens group, and a contact part extending from the focus lens group frame toward an object side and engaged with the linear motion member to cause the focus lens group frame to reciprocate in the optical axis direction. The contact part is disposed closer to the object side than a movable range of the linear motion member is during non-shooting.

DETAILED DESCRIPTION

Hereinafter, an exemplary embodiment of a lens barrel will be described with reference to the drawings. It should be noted that the exemplary embodiment below merely illustrates an example of the lens barrel. Therefore, the scope of the present disclosure is defined by the recitations in the claims with the following exemplary embodiment used as a reference and thus is not limited to the following exemplary embodiment only. Therefore, among constituent elements in the following exemplary embodiment, constituent elements that are not recited in any one of the independent claims indicating the most generic concepts of the present disclosure are not necessarily essential for achievement of the object of the present disclosure but are described as preferable components.

The drawings are schematic views in which emphasis, omission, and proportion adjustment are made as required for illustration of the present disclosure and may have shapes, positional relationships and proportions that differ from actual shapes, actual positional relationships, and actual proportions.

Schematic Configuration

Figure 1:
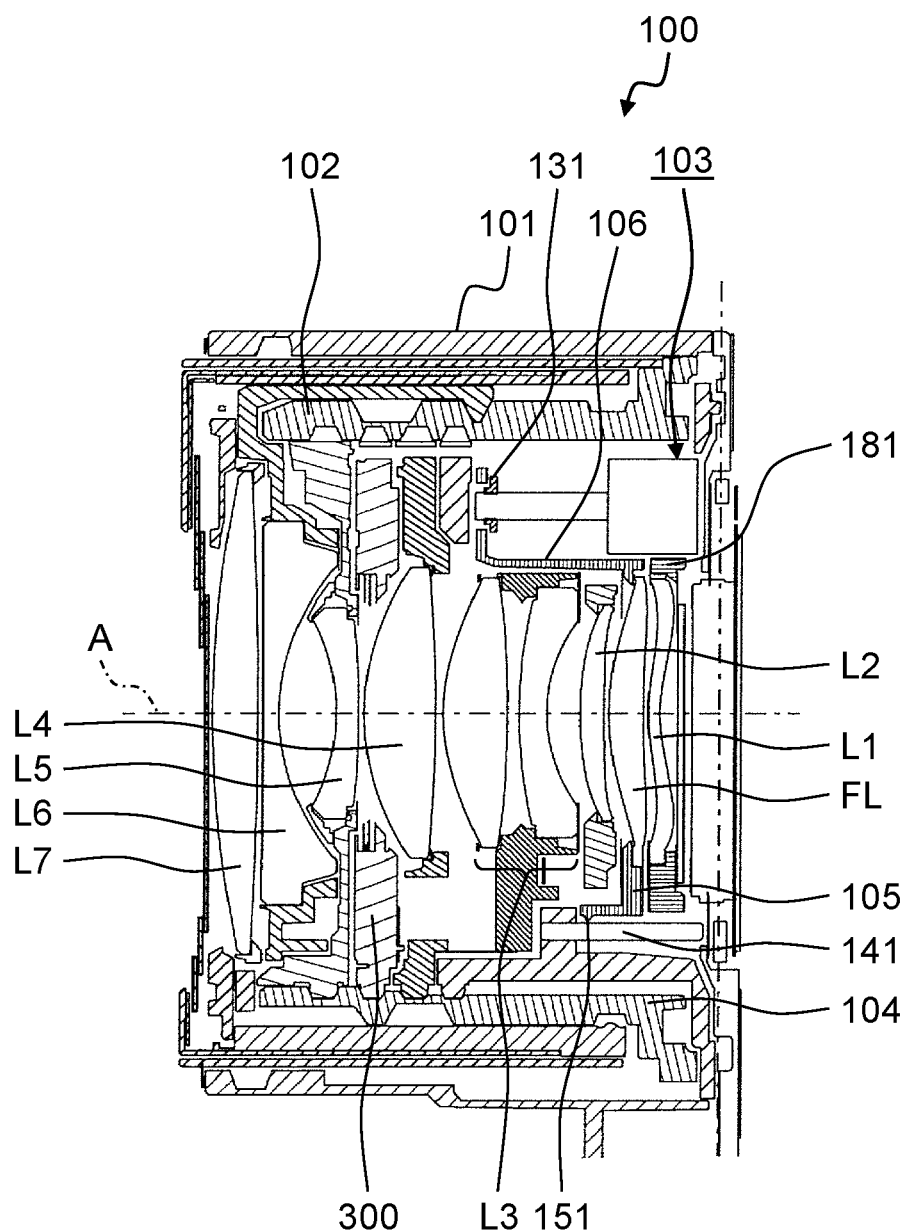
FIG. 1 is a sectional view illustrating a lens barrel in a collapsed position.

FIG. 1 is a sectional view illustrating a lens barrel in a collapsed position.

Figure 2:
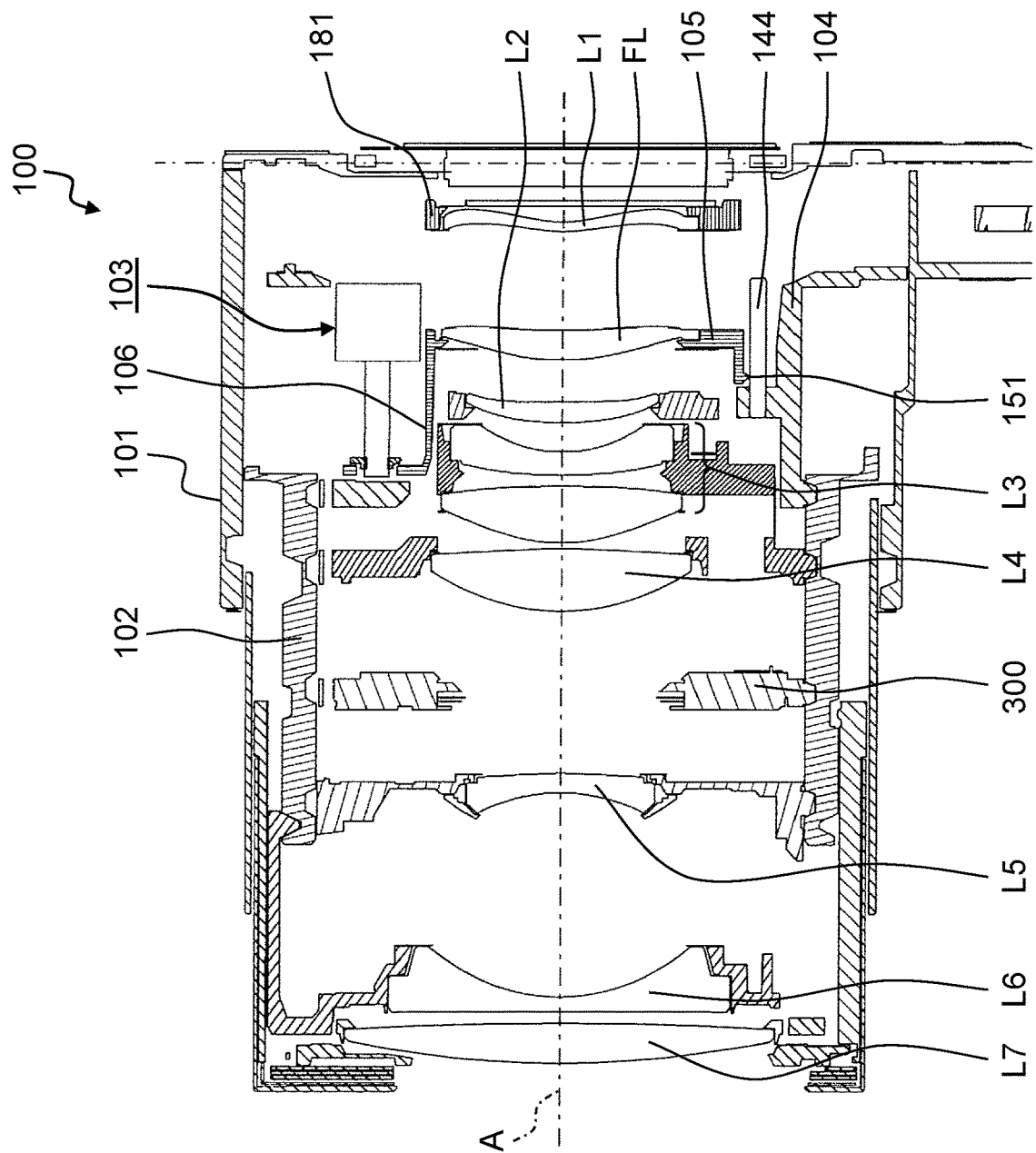
FIG. 2 is a sectional view illustrating a state where a focus lens group is on an object side at a wide-angle end position.

FIG. 2 is a sectional view illustrating a state where a focus lens group is on an object side at a wide-angle end position.

Figure 3:
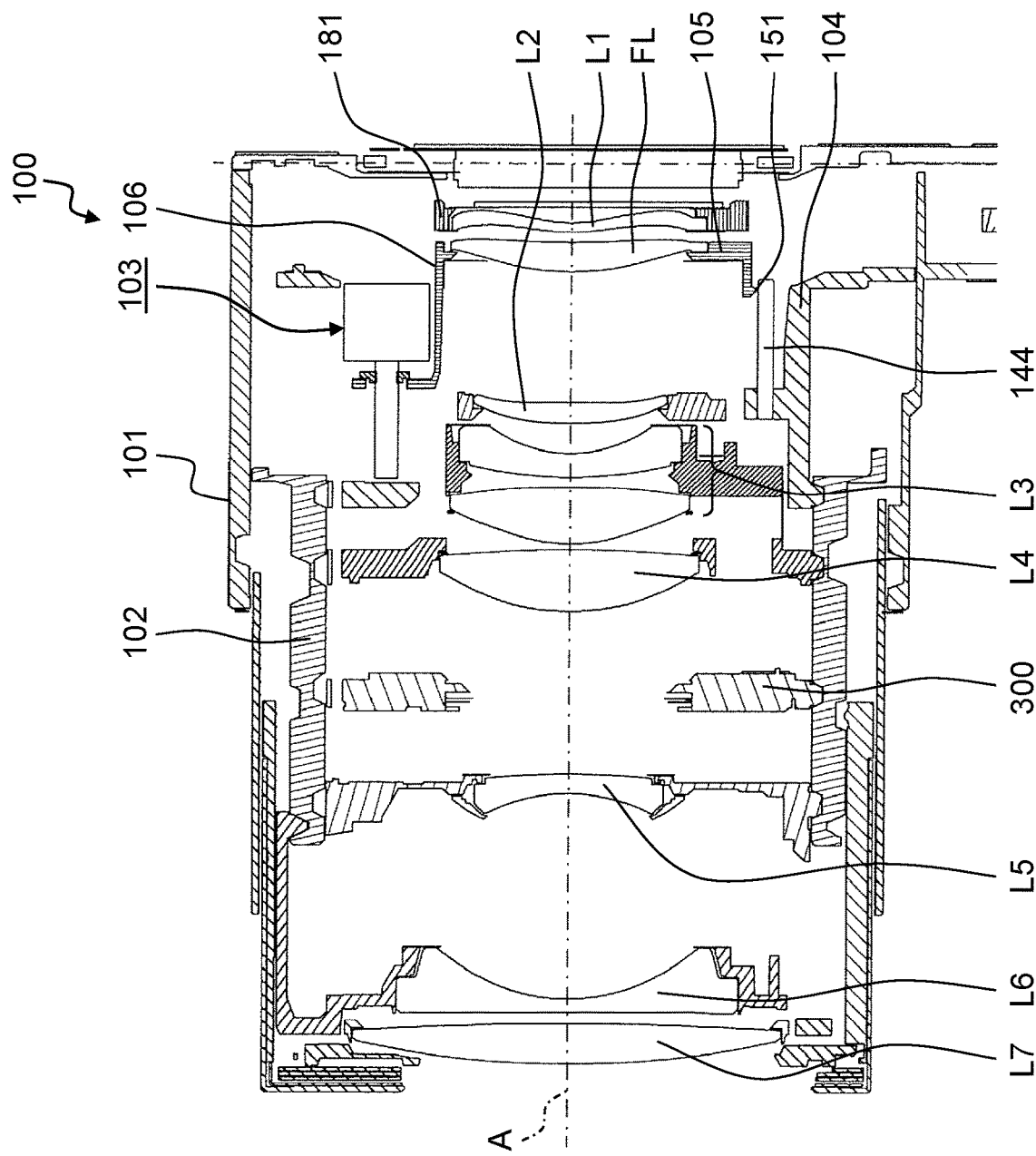
FIG. 3 is a sectional view illustrating a state where the focus lens group is on an image plane side at the wide-angle end position.

FIG. 3 is a sectional view illustrating a state where the focus lens group is on an image plane side at the wide-angle end position.

Figure 4:
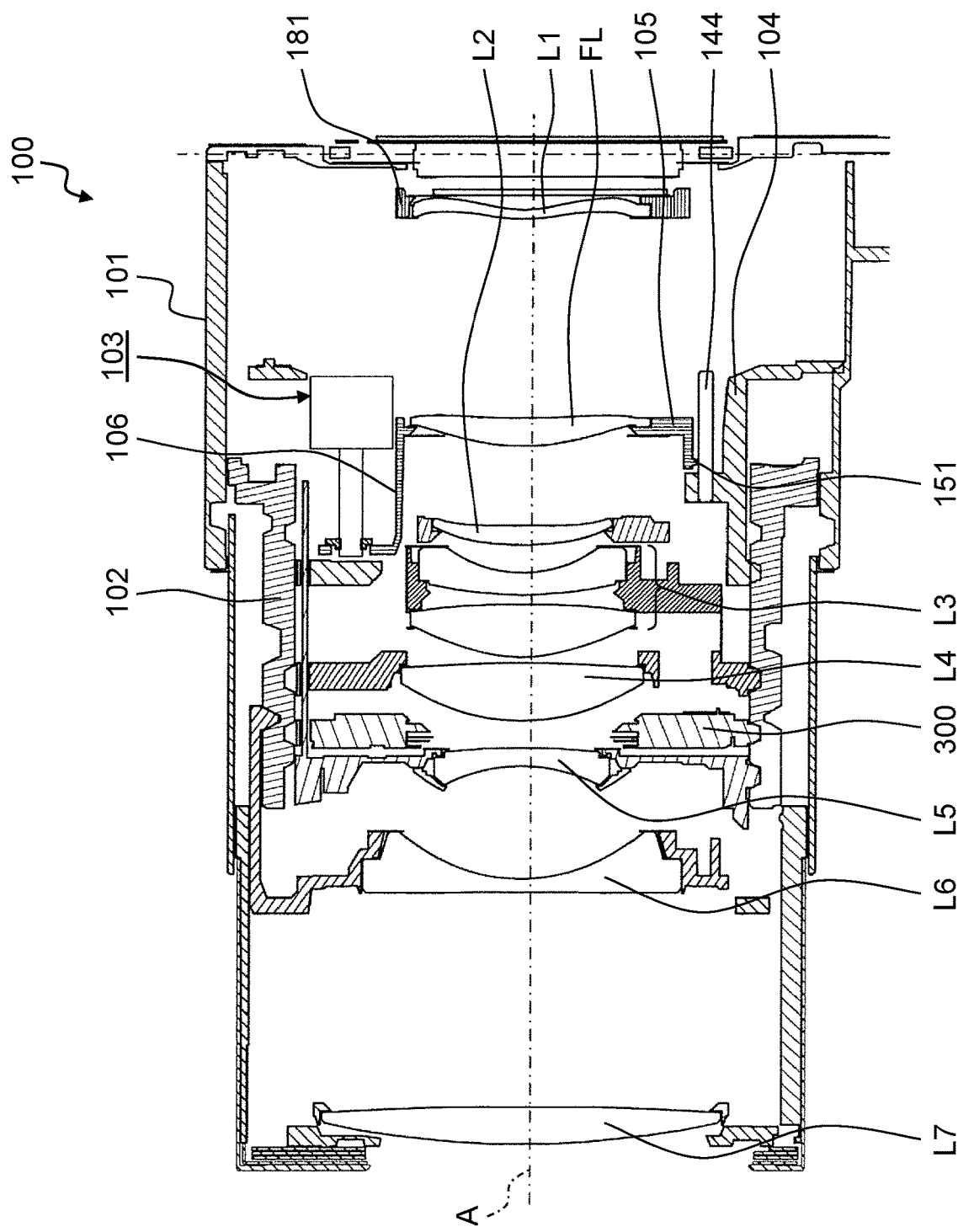
FIG. 4 is a sectional view illustrating a state where the focus lens group is on an object side at a telephoto end position.

FIG. 4 is a sectional view illustrating a state where the focus lens group is on an object side at a telephoto end position.

Figure 5:
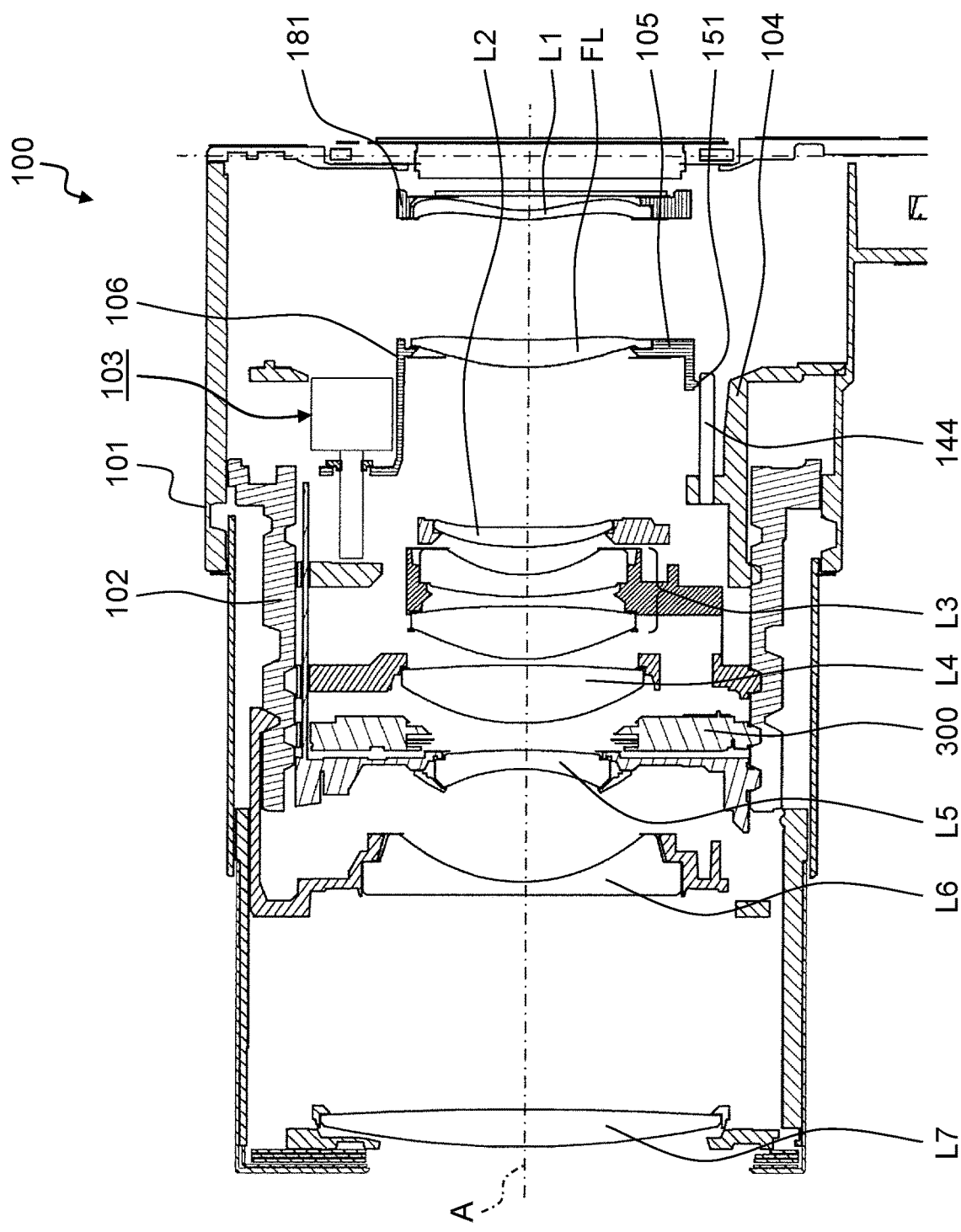
FIG. 5 is a sectional view illustrating a state where the focus lens group is on an image plane side at the telephoto end position.

FIG. 5 is a sectional view illustrating a state where the focus lens group is on an image plane side at the telephoto end position.

As illustrated in these drawings, lens barrel 100 is of a collapsible type and mounted to an imaging device (not illustrated) such as a digital still camera, a digital video camera, or a mobile terminal. Further, lens barrel 100 includes a plurality of lens groups capable of performing zooming during shooting. Further, to move a plurality of lens groups, lens barrel 100 includes base barrel 101, cam frame 102, drive device 103, drive device frame 104, focus lens group frame 105, and arm 106.

In the present exemplary embodiment, lens barrel 100 is also of a two-step collapsible type. Specifically, lens barrel 100 has one-group holding frame 181 holding first lens group L1, image stabilizer lens group L2 movable in a direction orthogonal to the direction of optical axis A (X axis direction in the drawings with the object side being defined as negative and the image plane side being defined as positive), shutter unit 300, and lens group holding frames for respectively holding other lens groups L3 to L7.

Herein, the term "lens group" is used to encompass a lens group including only one lens element. In addition, in principle, the term "barrel" is used herein as a member constituting an external shell of lens barrel 100, and the term "frame" is used herein as a member disposed inside the barrel to hold elements such as an optical member. However, the boundary between the "barrel" and the "frame" is vague, and they are not clearly distinguished from each other. Moreover, a member which is not perfectly formed into a barrel shape may sometimes be referred to as a "barrel".

First Lens Group L1

First lens group L1 is a lens group disposed closer to the image plane side than focus lens group FL is. In the present exemplary embodiment, first lens group L1 is an aspherical lens, and suppresses various aberrations. In addition, one-group holding frame 181 for holding first lens group L1 is not engaged with cam frame 102, and takes two positions in such a way to be disposed at a predetermined position by biasing force toward the object side during shooting, and to return to the image plane side when lens barrel 100 is collapsed.

Note that lens barrel 100 may be configured such that no lens group is disposed closer to the image plane side than focus lens group FL is.

Other Elements Such as Lens Groups

The other elements such as shutter unit 300 and respective lens group holding frames are directly or indirectly engaged with cam frame 102, and move in the direction of optical axis A due to the rotation of cam frame 102 without rotating.

Base Barrel 101

Base barrel 101 is a member mounted to an imaging device to serve as a basis of movement of each barrel and each frame.

Cam Frame 102

Cam frame 102 is a cylindrical member disposed inside base barrel 101. A plurality of cam grooves is provided on an inner peripheral surface of cam frame 102 so as to be engaged with the respective frames. Cam frame 102 rotates around an axis along the direction of optical axis A (X axis direction in the drawings) to thereby allow each frame to move in the direction of optical axis A by each amount of movement. In the present exemplary embodiment, cam frame 102 is engaged with base barrel 101, and movable in the direction of optical axis A relative to base barrel 101. In addition, the cam groove is a closed-end or open-end tapered groove, and may also be formed on an outer peripheral surface.

Drive Device 103

Figure 6:
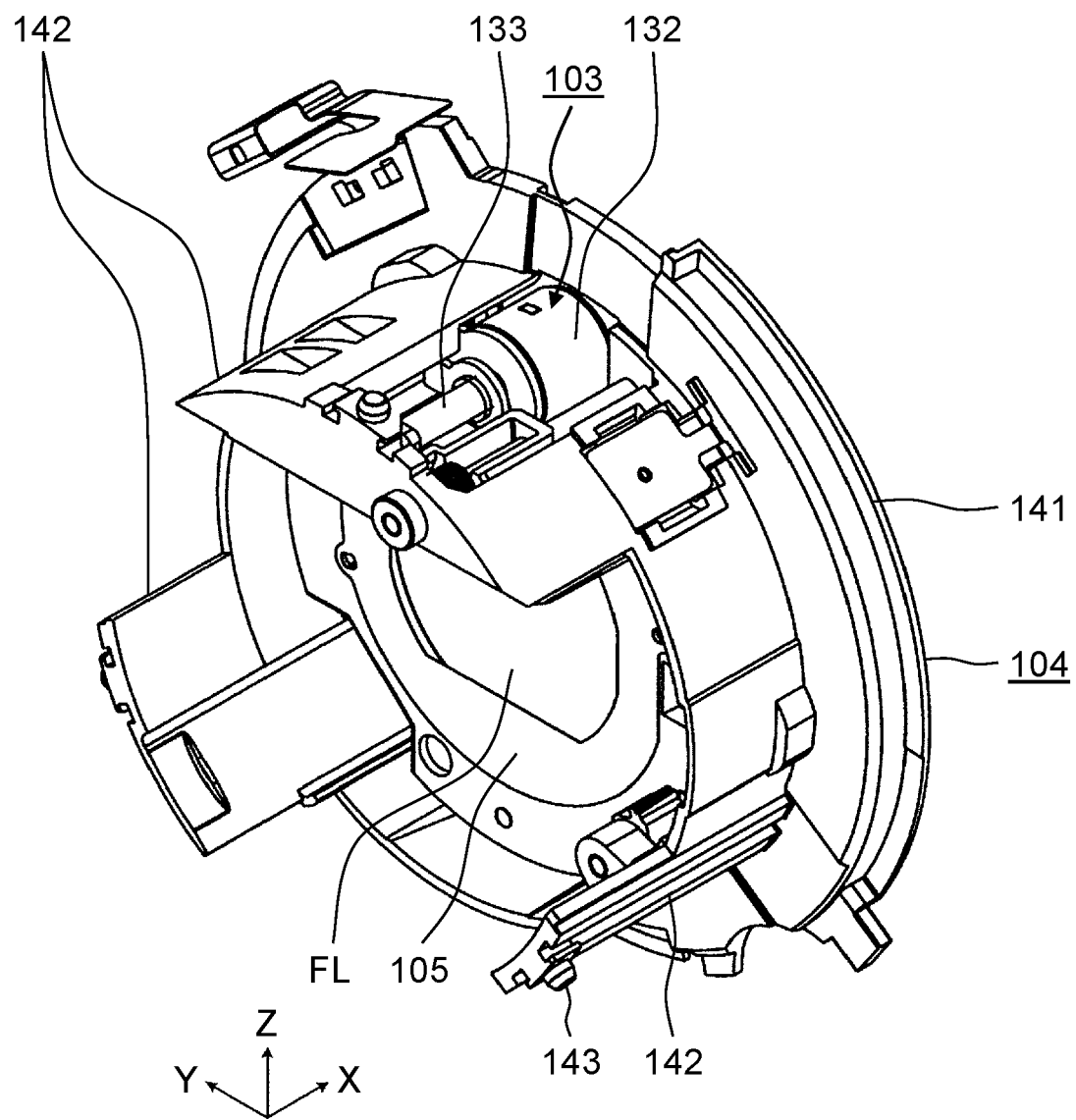
FIG. 6 is a perspective view illustrating a drive device, the focus lens group, and frames of these elements.

FIG. 6 is a perspective view illustrating the drive device, the focus lens group, and frames of these elements.

Figure 7:
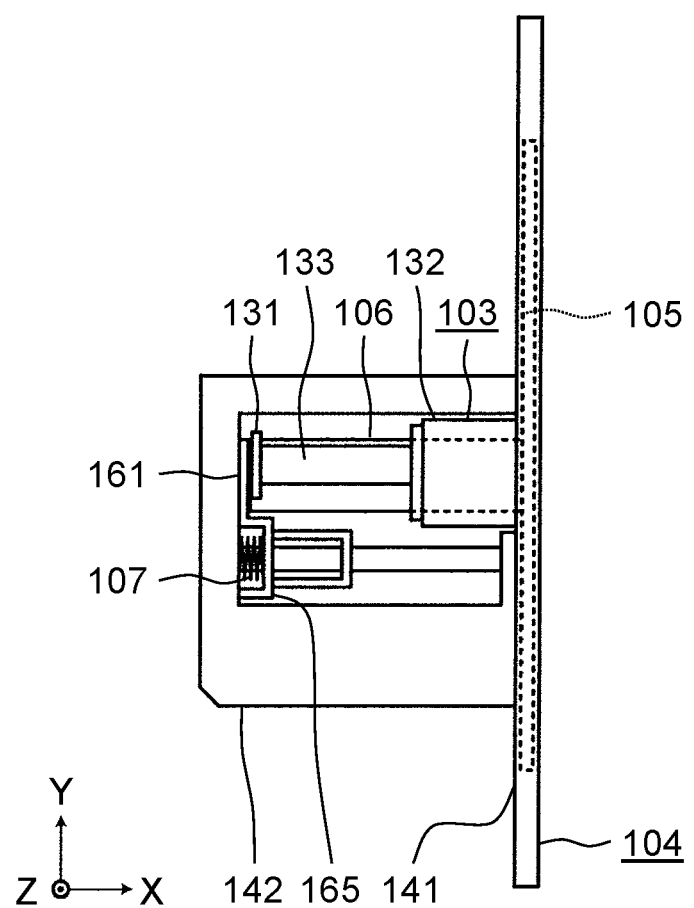
FIG. 7 is a side view schematically illustrating a state where a focus lens group frame is disposed on an object side end relative to a drive device frame.

FIG. 7 is a side view schematically illustrating a state where the focus lens group frame is disposed on an object side end relative to the drive device frame.

Figure 8:
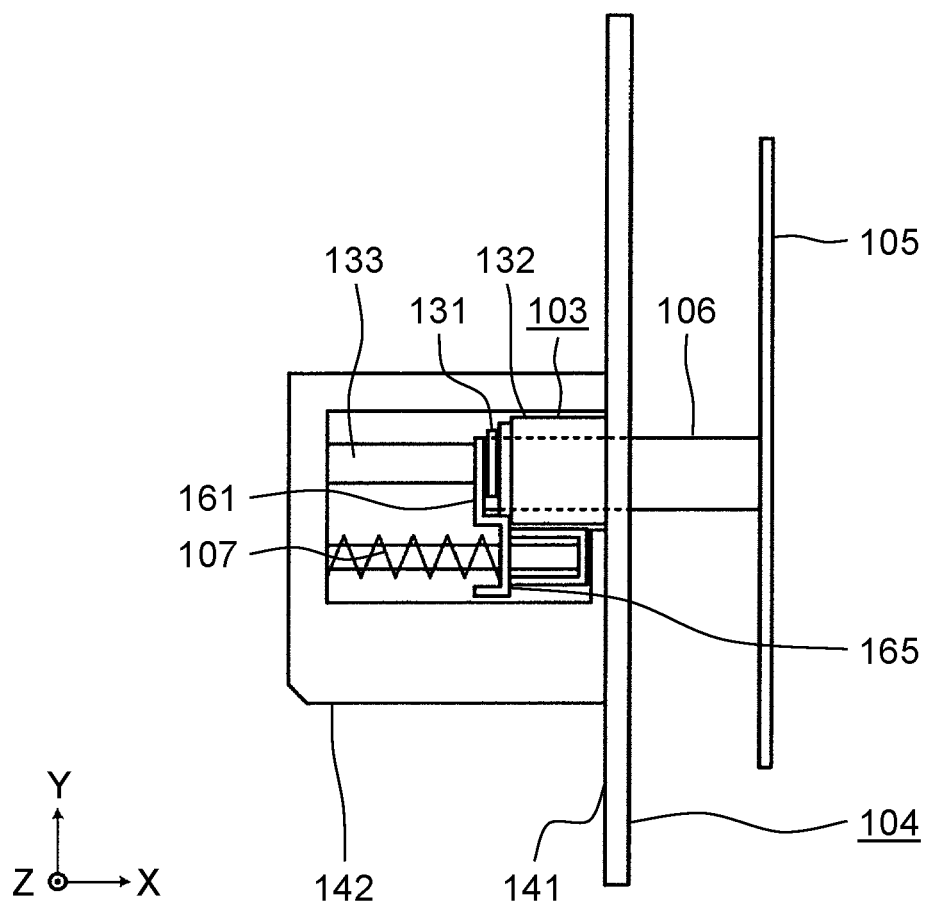
FIG. 8 is a side view schematically illustrating a state where the focus lens group frame is disposed on an image plane side end relative to the drive device frame.

FIG. 8 is a side view schematically illustrating a state where the focus lens group frame is disposed on an image plane side end relative to the drive device frame.

As illustrated in these drawings, drive device 103 is an actuator including linear motion member 131, drive source 132, and shaft body 133. Linear motion member 131 reciprocates along the direction of optical axis A. Drive source 132 is disposed closer to the image plane side (a positive direction in the X axis in the drawing) than linear motion member 131 is, and reciprocally drives linear motion member 131. Shaft body 133 transmits driving force of drive source 132 to linear motion member 131. In addition, drive device 103 is disposed in inward part of lens barrel 100.

In the present exemplary embodiment, shaft body 133 of drive device 103 is a so-called lead screw formed with a helical groove on the circumferential surface thereof. Linear motion member 131 is a nut which is engaged with the groove in shaft body 133 and can move forward or backward along the axial direction according to the rotating direction of shaft body 133. Shaft body 133 extends along the direction of optical axis A, and is disposed closer to the object side than drive source 132 is.

While the type of drive source 132 is not particularly limited, a stepping motor that can precisely control a rotational angle is used in the present exemplary embodiment for moving focus lens group FL to achieve focusing.

Drive Device Frame 104

Drive device frame 104 is a structural member which is engaged with the cam groove in cam frame 102 in a freely slidable manner, and reciprocates along the direction of optical axis A by the rotation of cam frame 102 to cause drive device 103 to reciprocate along the direction of optical axis A.

In the present exemplary embodiment, drive device frame 104 includes annular base part 141, columnar part 142, and engagement protrusion 143 as illustrated in FIG. 6. Columnar part 142 is provided at three locations of base part 141 so as to protrude therefrom toward the object side. Engagement protrusion 143 is formed on an object-side end of columnar part 142, and protrudes outward to be engaged with the cam groove in cam frame 102. In addition, drive device 103 is mounted to an inward part of columnar part 142 so as to be disposed closer to the image plane side than engagement protrusion 143 is.

According to the configuration described above, a movable region of linear motion member 131 of drive device 103 is ensured in a region closer to the image plane side than a position where engagement protrusion 143 and the cam groove are engaged with each other is.

Focus Lens Group Frame 105

Focus lens group frame 105 is a structural member for holding focus lens group FL. Focus lens group frame 105 is caused to reciprocate along the direction of optical axis A by drive device 103 through arm 106. Therefore, focus lens group frame 105 reciprocates relative to drive device frame 104. Focus lens group frame 105 also reciprocates along the direction of optical axis A relative to base barrel 101 by the rotation of cam frame 102 through drive device frame 104 and drive device 103.

In the present exemplary embodiment, focus lens group frame 105 has sliding arm 151 protruding toward the object side and is engaged with guide shaft 144 (see FIGS. 1 to 5) in a freely slidable manner. The guide shaft is attached to an object-side portion of drive device frame 104 so as to protrude toward the image plane side. According to the configuration described above, focus lens group frame 105 can smoothly move in the direction of optical axis A due to the movement of linear motion member 131 while being kept parallel to drive device frame 104. Further, since guide shaft 144 is straight from the object-side end to the image-plane-side end except for a fixing portion on the object-side end, focus lens group frame 105 can move to the image-plane-side end of guide shaft 144 in an engaged state.

Arm 106

Arm 106 extends toward the object side from focus lens group frame 105. Arm 106 is a member which is engaged with linear motion member 131 of drive device 103 to cause focus lens group frame 105 to reciprocate along the direction of optical axis A. In the present exemplary embodiment, a length of arm 106 in the direction of optical axis A is set to be longer than a reciprocating stroke of linear motion member 131 caused by shaft body 133. Specifically, when lens barrel 100 is collapsed, an object-side end of arm 106 is located closer to the object side than the reciprocating region of linear motion member 131 is. In addition, in this state, focus lens group frame 105 is located closer to the image plane side than the reciprocating region (the stroke) is.

In the present exemplary embodiment, the length of arm 106 in the direction of optical axis A is set such that, when lens barrel 100 is in a collapsed position, a plurality of lens groups, each of which independently moves relative to cam frame 102, is disposed inside arm 106.

Further, in the present exemplary embodiment, arm 106 has a contact part 161 which is brought into contact with an object-side surface of linear motion member 131. Contact part 161 is a flange-shaped portion formed on the object-side end of arm 106 so as to face linear motion member 131, and penetrates through shaft body 133. Arm 106 includes also receiving part 165 extending from contact part 161 toward the image plane side. In addition, biasing member 107 is provided between receiving part 165 and the object-side end of drive device frame 104. Biasing member 107 applies biasing force for pressing contact part 161 against linear motion member 131 to contact part 161 through receiving part 165.

According to the configuration described above, contact part 161 reciprocates following the reciprocating motion of linear motion member 131 in a region closer to the image plane side than the position where cam frame 102 and drive device frame 104 are engaged with each other is. Therefore, arm 106 and focus lens group frame 105 reciprocate along the direction of optical axis A.

In addition, arm 106 is integral with focus lens group frame 105, and focus lens group frame 105 is supported by guide shaft 144 fixed to drive device frame 104. Accordingly, arm 106 and focus lens group frame 105 can be driven in positive and negative directions of optical axis A (X axis) as being kept parallel to optical axis A with high precision with rattling of linear motion member 131 relative to shaft body 133 being reduced by biasing force of biasing member 107.

Further, even when lens barrel 100 is collapsed with linear motion member 131 being located on the image plane side due to control trouble and thus focus lens group frame 105 disposed to protrude toward the image plane side from drive device frame 104 is in contact with other members disposed closer to the image plane side than focus lens group frame 105 is, damage of arm 106 or other elements can be avoided because biasing member 107 contracts (deforms).

Operation
Collapsed Position

The operation of collapsible lens barrel 100 which is configured as described above and can perform zooming will be described below.

In the collapsed position illustrated in FIG. 1, cam frame 102, drive device 103, drive device frame 104, focus lens group frame 105, arm 106, first lens group L1, one-group holding frame 181, image stabilizer lens group L2, shutter unit 300, and lens groups L3 to L7 are disposed inside base barrel 101. Further, almost all the lens group holding frames for holding respective lens groups L3 to L7 are disposed inside base barrel 101.

In addition, image stabilizer lens group L2 and third lens group L3 are disposed on an inner side relative to arm 106. Due to one-group holding frame 181 being pushed toward the image plane side from drive device frame 104 or the like, first lens group L1 is disposed on the image plane side.

In this case, arm 106 can freely move toward the object side relative to linear motion member 131 against the biasing force from biasing member 107. Therefore, even when linear motion member 131 of drive device 103 is disposed on the image plane side, arm 106 and focus lens group frame 105 connected to arm 106 are not damaged.

During Shooting
Wide-Angle End

Due to the activation of an actuator (not illustrated) when lens barrel 100 is in the collapsed position, cam frame 102 rotates. Due to the rotation of cam frame 102, drive device frame 104 and respective lens group holding frames are guided along the cam grooves to be moved toward the object side along optical axis A. Cam frame 102 also moves toward the object side.

Specifically, as illustrated in FIGS. 2 and 3, to move seventh lens group L7 and sixth lens group L6 largely from the collapsed position, cam frame 102 also moves largely toward the object side. In this case, drive device frame 104 is engaged with the cam groove at a position closest to the image-plane-side end of cam frame 102, whereby focus lens group FL can be disposed as close to the image plane side as possible. In addition, focus lens group frame 105 can further be protruded toward the image plane side by moving arm 106 toward the image plane side by using drive device 103 (see FIG. 3). Thus, the length of cam frame 102 in the direction of optical axis A can be reduced, while a focusing range required at the wide-angle end is ensured. Accordingly, the length of lens barrel 100 in the direction of optical axis A in a collapsed position can be reduced.

Telephoto End

As in the state where lens barrel 100 is in the wide-angle end position from the collapsed position, drive device frame 104 and respective lens group holding frames are respectively guided along the cam grooves due to the rotation of cam frame 102 to be moved to a position suitable for a telephoto end, as illustrated in FIGS. 4 and 5. Notably, lens barrel 100 can be moved to an intermediate position according to magnification as well as from the wide-angle end to the telephoto end, and thus, can perform a zooming operation.

The engagement position where the cam groove in cam frame 102 and drive device frame 104 are engaged with each other is on the portion of cam frame 102 closest to the image plane side at the wide-angle end illustrated in FIGS. 2 and 3. However, at the telephoto end, the engagement position where the cam groove in cam frame 102 and drive device frame 104 are engaged with each other is closer to the object side than the engagement position at the wide-angle end is. Thus, as previously described, the length of lens barrel 100 in the collapsed position can be reduced, and the focusing range required at the telephoto end can be ensured.

Effects and Others

When lens barrel 100 is configured so that drive device 103 is disposed in the inward part of with the entire length of lens barrel 100 in a collapsed position being reduced, long shaft body 133 cannot be disposed, and thus the stroke of linear motion member 131 is limited to limit the amount of movement of focus lens group FL. Further, the length of cam frame 102 in the direction of optical axis A is also limited to be short.

Under such a circumstance, according to the present exemplary embodiment, focus lens group FL can be disposed as close to the image plane side as possible by moving arm 106 toward the image plane side in drive device frame 104. This achieves focusing effectively even at the wide-angle end.

In addition, according to the configuration described above, lens barrel 100 which has a short entire length in the collapsed position can be provided with a plurality of lens groups and image stabilizer mechanism, and thus, lens barrel 100 capable of varying magnification in a wide range can be provided.

Note that the present disclosure is not limited to the above-mentioned exemplary embodiment. For example, other exemplary embodiments that are realized by combining the constituent elements of choice that are described in this description or omitting some of the constituent elements may also be exemplary embodiments of the present disclosure. In addition, modifications obtainable through various changes to the above exemplary embodiments that are conceived by those skilled in the art without departing from the essence of the present disclosure, that is to say, the meaning of the recitations in the claims are also included in the present disclosure.

For example, the present exemplary embodiment has described that the length of arm 106 in the direction of optical axis A is longer than the reciprocating stroke of linear motion member 131 due to shaft body 133. However, the similar effect can be obtained even if the length of arm 106 in the direction of optical axis A is equal to or shorter than the reciprocating stroke of linear motion member 131, so long as the object-side end of arm 106 is located closer to the object side than the reciprocating region of linear motion member 131 in the collapsed position of lens barrel 100 is and contact part 161 is disposed closer to the object side than the movable range of linear motion member 131 is during non-shooting. It should be noted that, if the length of arm 106 in the direction of optical axis A is set longer than the reciprocating stroke of linear motion member 131 due to shaft body 133, focus lens group frame 105 can be moved further to the image plane side during shooting.

For example, while the present exemplary embodiment shows the configuration in which first lens group L1 is located closer to the image plane side than focus lens group FL is, the configuration in which first lens group L1 is not on this position is included in the present disclosure.

In addition, for drive device 103, not only a device that converts a rotational motion into a linear motion but also a device, such as a linear motor, that drives linear motion member 131 without a rotational motion may be used.

The present disclosure is applicable to a compact digital camera or an imaging device in which a lens barrel is exchangeable. In addition, when the lens barrel of the present disclosure is applied to a mobile device such as a mobile phone terminal or a personal digital assist (PDA), a zoom magnification of these devices can be increased with the reduction in size being achieved.

What is claimed is:

1. A collapsible lens barrel used for an imaging device, the collapsible lens barrel comprising:
    a base barrel mounted to the imaging device;
    a drive device including a linear motion member reciprocating in an optical axis direction and a drive source for driving the linear motion member;
    a cam frame disposed inside the base barrel and provided with a cam groove;
    a drive device frame that is engaged with the cam groove in the cam frame and causes the drive device to reciprocate in the optical axis direction;
    a focus lens group frame that holds a focus lens group; and
    a contact part and an arm that extend from the focus lens group frame toward an object side and are engaged with the linear motion member to cause the focus lens group frame to reciprocate in the optical axis direction,
    wherein, in a collapsed position, a plurality of lens groups is disposed inside the arm.

2. A collapsible lens barrel used for an imaging device, the collapsible lens barrel comprising:
    a base barrel mounted to the imaging device;
    a drive device including a linear motion member reciprocating in an optical axis direction and a drive source for driving the linear motion member;
    a cam frame disposed inside the base barrel and provided with a cam groove;
    a drive device frame that is engaged with the cam groove in the cam frame and causes the drive device to reciprocate in the optical axis direction;
    a focus lens group frame that holds a focus lens group; and
    a contact part and an arm that extend from the focus lens group frame toward an object side and are engaged with the linear motion member to cause the focus lens group frame to reciprocate in the optical axis direction,
    wherein, when the lens barrel is in a shootable state the focus lens group frame is movable between an object-side position and an image-side position, and when the lens barrel is in the shootable state and the focus lens group frame is at the image-side position the focus lens group frame extends further toward an image plane side than the drive device frame does.

3. The collapsible lens barrel according to claim 1, wherein the contact part is located closer to an object side than a movable stroke of the linear motion member is during non-shooting.

4. The collapsible lens barrel according to claim 1, wherein, an engagement position on the cam frame between the cam groove and the drive device frame is located on an image-plane-side portion of the cam frame at a wide-angle end, and at a telephoto end, located closer to an object side than the engagement position at a wide-angle end is.

5. The collapsible lens barrel according to claim 1, wherein a length of the arm is longer than a stroke of the linear motion member.

6. The collapsible lens barrel according to claim 1, wherein
    the arm further includes the contact part in contact with an object-side surface of the linear motion member, and
    the collapsible lens barrel further comprises a biasing member attached to the drive device frame to apply biasing force for pressing the contact part against the linear motion member.

7. The collapsible lens barrel according to claim 1, further comprising a first lens group disposed closer to an image plane side than the focus lens group is.

* * * * *